July 21, 1925.

Re.16,124

W. KELSO

CAR COUPLER

Original Filed Jan. 31, 1923 2 Sheets-Sheet 1

Inventor

William Kelso

By Potter & Potter his Attorneys

July 21, 1925.

Re.16,124

W. KELSO

CAR COUPLER

Original Filed Jan. 31, 1923 2 Sheets-Sheet 2

Inventor

William Kelso

By

Their Attorneys

Reissued July 21, 1925. Re. 16,124

UNITED STATES PATENT OFFICE.

WILLIAM KELSO, OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

CAR COUPLER.

Original No. 1,499,060, dated June 24, 1924, Serial No. 616,122, filed January 31, 1923. Application for reissue filed February 27, 1925. Serial No. 12,183.

*To all whom it may concern:*

Be it known that I, WILLIAM KELSO, a citizen of the United States, residing at Pittsburgh, in the county of Allegheny and State of Pennsylvania, have invented certain new and useful Improvements in Car Couplers; and I do hereby declare the following to be a full, clear, and exact description of the invention, such as will enable others skilled in the art to which it appertains to make and use the same.

My invention relates to car couplers, and particularly to the well known form termed the Master Car Builders' standard D-coupler. While the improvements hereinafter described and claimed are especially designed for the betterment of the D-coupler, it is to be understood that said improvements are not limited in their application to that specific type.

The primary object of the invention is to provide means for preventing the lock lifter of a top operating D-coupler from dropping to a position precluding the coupler lock from being brought to an unlocked position by the coupler release rigging mechanism provided for that purpose.

A further object of the invention is to provide simple and reliable means for preventing accidental unlocking of the coupler efficiently operating in conjunction with means for limiting the extent to which the lock lifter can drop with respect to the coupler lock.

Outward rotation of the knuckle of the D-coupler is normally prevented by a vertically sliding and rearwardly swinging lock. When these couplers are applied to freight cars the coupler lock is generally actuated by a lifter member movably connected at its lower end to the lock and extending upwardly through the coupler head so as to be connected to a suitable uncoupling rod or release rigging mechanism. When the coupler lock and its lifter are in normal locked relation the lower end of the lifter projects beneath a shoulder or lock down lug with which the coupler head is provided. This relation of the lock lifter to the shoulder or lock down lug of the coupler head is intended to prevent the lock from accidentally moving upward and assuming an unlocked position. In the D-coupler as at present constructed the association of a worn lock lifter with a coupler having a lock down lug which has been cast short or has become reduced in length by wear permits the lifter to descend beyond its normal position until the trunnions with which it is provided at its lower end pass out of the lifter receiving slot of the coupler lock. In this altered position of the lifter the coupler lock cannot be actuated by the release rigging devices intended to perform that function. To unlock a coupler under such conditions it is necessary for the trainman to go between the cars where he can reach the lifter and then endeavor by careful manipulation to restore its trunnions to proper position in the lifter receiving slot of the locking block. If the lifter cannot thus be returned to a position permitting it to be pulled past the lock down lug of the coupler head, it is necessary to cut the knuckle or other parts before the coupler can be dismantled. Under similar conditions of association of a short lock down lug and a worn lifter, the disconnection of the uncoupling rod or release rigging from the lifter may result, if care is not taken, in permitting the lifter to drop down into the interior of the coupler head. In that case also the destruction of the knuckle or other member of the mechanism is necessary before the coupler parts can be disassociated.

By my invention the defect incident to the presence of short lock down lugs or worn lifters in the D-coupler as now constructed is obviated; and this desirable result is achieved without necessitating any such change in the form of the lock or of the lifter as would prevent parts of the improved design from being assembled with the present standard form of coupler head of this type. Coupler locks and lock lifters embodying the invention are thus capable of being substituted for corresponding parts of the usual form.

When in locked position the lock of the Master Car Builders' D-coupler is seated upon the knuckle opening lever of the mechanism. By reason of inequalities of manufacture of parts assembled in new D-couplers, the lower end of the depending leg of the coupler lock may assume a position at the forward end of the opening in the bottom of the coupler head, as illustrated in Figs. 1 and 4; but this leg usually positions itself toward the rear of the opening because the location of the center of gravity of the locking block is in advance of the point at which the lock rests upon the knuckle opening lever and this naturally causes the depending leg of the lock to assume a position at the rear of the opening or at some intermediate point thereof. Even where the lower end of the leg of the lock does not position itself at the rear of the opening of the coupler head when the device is new, subsequent wear of the parts results in causing said leg to assume a normal locked position in the rear part of the opening. The freedom of oscillation of the leg of the lock in the opening of the coupler head tends in service to induce release of the lock from control of the means designed to prevent an accidental unlocking of the coupler. As will be readily appreciated, the friction existing between the pulling faces of the knuckles of connected car couplers causes the outer ends of the knuckles to move vertically with respect to each other when the cars pass over high or low points of railway tracks. The rear part of the knuckle which bears against the locking block is thus caused to perform vertical movements opposite in direction from those executed by the outer end of the knuckle. Because of the friction between the knuckle and the lock these movements of the knuckle induce an upward creeping of the lock of the D-coupler. The ability of the lower part of the leg of the lock to move forward and backward to the extent of its clearance in the opening of the coupler head permits a similar movement of the upper part of the lock. Due to the friction between the lock and the lower portion of the lifter, this tends to cause the latter to move or be forced outwardly from beneath the shoulder or lock down lug with which the D-coupler head is provided, thus enabling the lock to complete an unlocking movement permitting accidental outward rotation of the knuckle. This defect of the D-coupler in permitting an accidental unlocking operation of locks which are actuated by top operating release mechanism also is remedied by my invention.

In the drawings illustrating my invention as applied to a Master Car Builders' standard D-coupler,—

Figure 1:
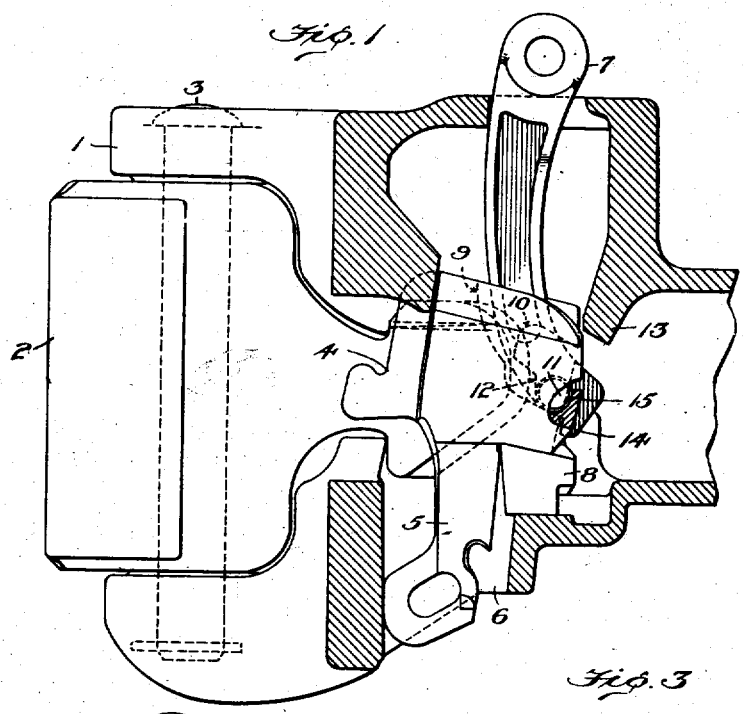
Figure 1 is a vertical sectional view of a coupler, the lock, knuckle opener, knuckle and lock lifter being in elevation, the parts being in locked relation and the lower end of the leg of the lock being shown as positioned in the forward part of the opening through the bottom wall of the coupler head.

In the drawings, 1 is the coupler head and 2 is the knuckle. The knuckle is rotatably mounted upon the coupler head by means of the usual knuckle pin 3. Outward rotation of the knuckle is normally restrained by means of a locking block 4 having a depending leg 5 which extends downwardly through an opening 6 in the bottom wall of the coupler head. The lock 4 is capable of sliding vertically and swinging rearwardly in the coupler head upon being actuated by the lock lifter 7. After the lock 4 has been raised sufficiently to withdraw its upper portion from in front of the tail of the knuckle it executes a rearward swinging movement causing its depending leg 5 to press rearwardly against the knuckle opening lever 8, thereby effecting a knuckle throwing rotation of the latter. This knuckle opening member 8, as employed in the D-coupler, is a horizontally rotatable lever pivotally mounted upon the lower wall of the coupler head, one end of said lever being disposed in the path of rearward movement of the leg 5 of the lock and its other end extending behind the tail of the knuckle in position to communicate an uncoupling rotation to the latter. When in locked position the locking block 4 is supported by the knuckle opening lever 8.

The lifter 7 is slidably and pivotally connected to the lock 4. For this purpose the upper end of the lock has an upwardly and rearwardly opening slot 9 for receiving the lower end of the lifter, the side walls of said slot being provided with guideways or recesses 10 into which oppositely extending pintles or trunnions 11 of the lifter project and within which said trunnions operate. These guideways are preferably formed with vertically extending faces or shoulders 12 which by engaging the respective trunnions 11 compel the portion of the lifter which normally projects rearwardly beyond the lock 4 to execute a preliminary upward movement before the lower end of said lifter can be drawn into the slot 9 of the lock so as to clear the usual lock down lug or shoulder 13 with which the coupler head 1 is provided. For the purpose of compelling the lower end of the lock lifter 7 to perform a preliminary vertical movement toward the lock down lug 13 before said lifter can be withdrawn from beneath the latter, the lower end of said lifter also is preferably formed with a downwardly extending portion or lug 14 which overlaps the rear face of the lock 4 below the slot 9 therein when the parts are in normal locked relation. After the lifter 7 has been moved upward sufficiently with respect to the lock 4 the lug 14 is adapted to enter the slot 9, the configuration of the lower wall of the latter being such that proper clearance for said lug is afforded when the lock and lifter execute their relative turning movements during the knuckle opening operation of the mechanism.

To maintain the lifter 7 in such relation that it is capable of actuating the lock 4 notwithstanding that the lock down lug 13 may be of decreased length or the lifter may have been considerably worn in service, means are provided for limiting the extent to which the lower end of said lifter may project rearwardly beyond said lug. These means are preferably provided by forming the lock 4 upon one side of its slot 9 with a wall or lug 15 adapted to engage a neighboring trunnion 11, thus affording a stop arresting downward movement of the lifter 7 beyond its proper normal position.

Upon pulling upwardly on the lifter 7 its lower end moves vertically toward the lock down lug 13 until the trunnions 11 reach the upper ends of the faces 12 of their guideways 10 and the lower end 14 of the lifter is in position to pass into the slot 9 of the lock. After this preliminary movement the continued upward pull upon the lifter causes its lower end to be retracted into the slot 9 of the lock, thus withdrawing it from beneath the lock down lug or shoulder 13 and thereby releasing the lock 4 so that it may perform an unlocking movement. As soon as the trunnions 11 reach the upper ends of their guideways in the side walls of the lock the raising of the lifter causes the lock to move vertically until the knuckle 2 is unlocked. If the knuckle is free to rotate a continued upward pull upon the lifter 7 causes a rearward swinging of the depending leg 5 of the lock resulting in the well known knuckle throwing operation of the knuckle opening lever 8.

Figure 2:
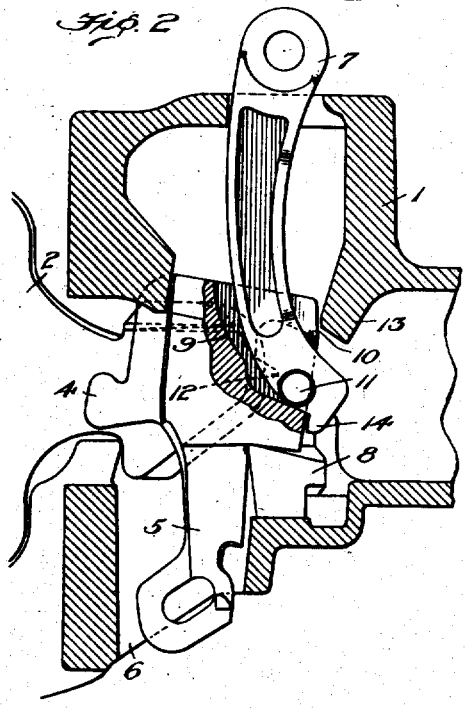
Figure 2 is a detail view corresponding to Fig. 1, portions of the lock being broken away and its depending leg being shown as positioned in the rear end of the opening through the bottom wall of the coupler head.
Figure 3:
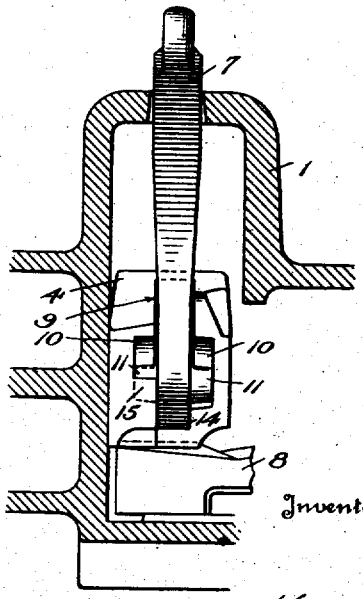
Figure 3 is a detail view, partly in transverse section and partly in rear elevation, showing a portion of the mechanism.
Figure 4:
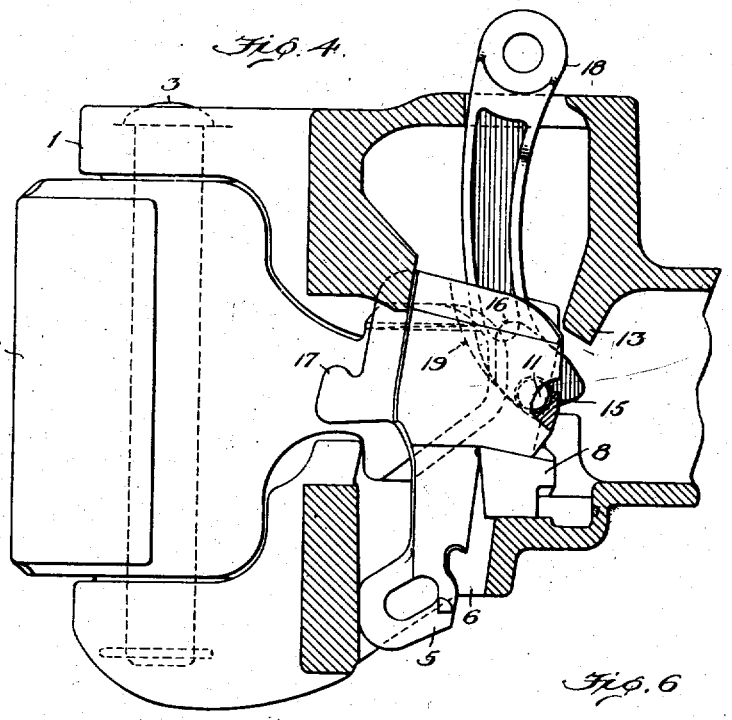
Figure 4, Figure 5 and Figure 6 are views respectively corresponding to Figs. 1, 2 and 3, but illustrating a modification of the invention.
Figure 5:
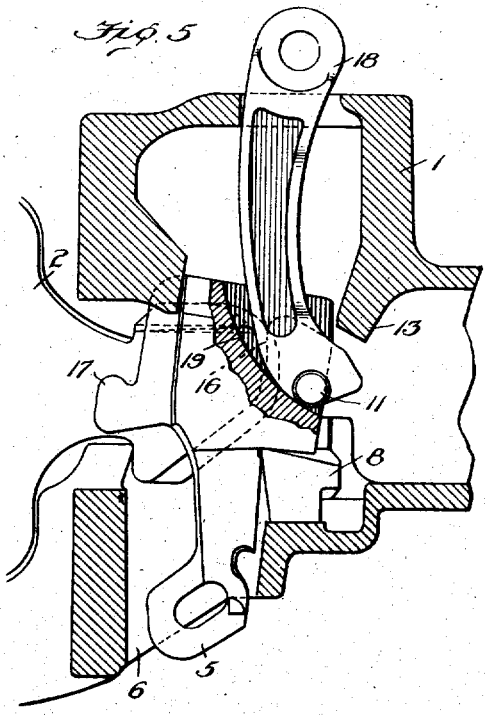
Figure 6:
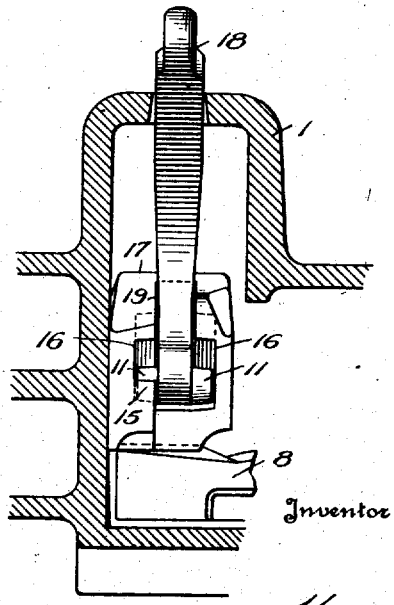

In the modified form of the invention illustrated in Figs. 4, 5 and 6 the lower end of the lock lifter may be withdrawn from beneath the lock down lug 13 of the coupler head without first performing a preliminary vertical movement toward said lug. In this construction the guideways 16 of the lock 17 for receiving the trunnions 11 of the lifter 18 are so formed that an upward pull upon the upper end of the lifter 18 causes its lower end immediately to initiate a retractile movement into the lifter receiving slot 19 of the lock, such movement being permitted not only by reason of the absence of shoulders 12 for engaging the trunnions of the lifter 18, but also because said lifter is unprovided with any part corresponding in form or function to the lug 14 with which the structure heretofore described is furnished. Downward movement of the lifter 18 with respect to the lock 17 is limited by the engagement of one of the trunnions of said lifter with the wall or stop lug 15 with which the lock is provided. Except for the differences referred to the device illustrated in Figs. 4, 5 and 6 is preferably the same in construction as that disclosed in Figs. 1, 2 and 3 heretofore described; and accordingly similar parts have been identified by corresponding reference numerals.

I claim:—

1. In a car coupler, the combination with a coupler head, knuckle, and vertically movable lock for said knuckle, of a lifter for actuating said lock, said lifter being operatively connected to said lock so as to be slidably and pivotally movable with respect thereto, said head being provided with a shoulder adapted to engage the lower end of said lifter to prevent accidental unlocking of said lock, the lower end of said lifter being adapted to project beyond said lock beneath said shoulder, said lock being formed with a slot for receiving said lifter which opens upwardly and also opens through one of the sides of said lock, said lifter being provided with means for engaging said lock to prevent said lifter from being withdrawn from beneath said shoulder until after it has executed a preliminary movement toward said shoulder, and said lock and lifter being provided with cooperating means for limiting the extent to which the lower end of said lifter may project beyond said lock.

2. In a car coupler, the combination with a coupler head, knuckle, and vertically sliding and rearwardly swinging lock for said knuckle, of a lifter for actuating said lock, said head being provided with a shoulder adapted to engage the lower end of said lifter to prevent accidental unlocking of said lock, said lifter being furnished with oppositely extending trunnions and its lower end being adapted to project beyond said lock beneath said shoulder, and said lifter also having a downwardly projecting lug which normally overlaps said lock to prevent said lifter from being withdrawn from beneath said shoulder until after it has executed a preliminary movement toward said shoulder, and said lock being provided with an upwardly and rearwardly opening slot for receiving said lifter and having guideways for respectively cooperating with said trunnions and also being provided with a lug for engaging one of said trunnions to limit downward movement of said lifter with respect to said lock.

3. In a car coupler, the combination with a coupler head, knuckle, and vertically sliding and rearwardly swinging lock for said knuckle, of a lifter for actuating said lock, said lifter being formed with oppositely extending trunnions, said lock being provided at its upper end with an upwardly and rearwardly opening slot whose side walls are formed with guideways for receiving trunnions carried by said lifter, said lock being provided at one side of said slot with a lug adapted to engage a trunnion of said lifter to limit rearward movement of said trunnions in said guideways, said lifter being slidably and rotatably movable in said slot, said head being provided with a shoulder adapted to engage the lower end of said lifter to prevent accidental unlocking of said lock, and the lower end of said lifter being adapted to project beyond said lock beneath said shoulder.

4. In a car coupler, the combination with a coupler head, knuckle, and vertically sliding and rearwardly swinging lock for said knuckle, of a lifter for actuating said lock, said lock being provided at its upper end with an upwardly and rearwardly opening slot, said lifter being slidably and rotatably movable in said slot and having oppositely extending trunnions projecting into guideways formed in opposite walls of said slot, said lock being provided at one side of said slot with a lug adapted to engage one of said trunnions to limit rearward movement of the lower end of said lifter with respect to said lock, one of said guideways being formed intermediate its ends with a shoulder adapted to engage the adjacent trunnion to compel the lower end of said lifter to execute a preliminary upward movement before actuating said lock, said head being provided with a shoulder adapted to engage the lower end of said lifter to prevent accidental unlocking of said lock, and the lower end of said lifter being adapted to project beyond said lock beneath said shoulder.

5. In a car coupler, the combination with a coupler head, knuckle, and vertically sliding and rearwardly swinging lock for said knuckle, of a lifter for actuating said lock, said head being provided with a shoulder adapted to engage the lower end of said lifter to prevent accidental unlocking of said lock, said lock being provided at its upper end with an upwardly and rearwardly opening slot, said lifter being slidably and rotatably movable in said slot and having a downwardly projecting lug which normally overlaps said lock to prevent said lifter from being withdrawn from beneath said shoulder until after it has executed a preliminary movement toward said shoulder, and the lower wall of said slot being formed with a recess allowing rotary movement of said projecting lug after it has been retracted into said slot.

6. In a car coupler, the combination with a coupler head, knuckle, a knuckle opening lever, and a gravity actuated lock for said knuckle adapted to swing rearwardly so as to engage and actuate said knuckle opening lever, of a lifter for actuating said lock, said head being provided rearwardly of said lock with a shoulder adapted to engage the lower end of said lifter to prevent accidental unlocking of said lock, said lock being provided at its upper end with a slot which opens upwardly and also through the rear face of said lock, said lifter being slidably and rotatably movable in said slot and its lower end being adapted to project rearwardly through said slot so as to extend beneath said shoulder when the parts of the coupler are in normal locked relation, and said lock and lifter being provided with cooperating portions adapted to compel the lower end of said lifter to execute a preliminary upward movement toward said shoulder before passing from beneath the latter.

7. In a car coupler, the combination with a coupler head, knuckle, a knuckle opening lever, and a vertically movable lock for said knuckle adapted to swing rearwardly so as to engage and actuate said knuckle opening lever, of a lifter for actuating said lock, said head being provided rearwardly of said lock with a shoulder adapted to engage the lower end of said lifter to prevent accidental unlocking of said lock, said lifter being formed intermediate its ends with oppositely extending trunnions and its lower end being adapted to stand beneath said shoulder when the parts of the coupler are in normal locked relation, said lock being provided at its upper end with an upwardly and rearwardly opening slot whose side walls are formed with guideways for said trunnions, and said lifter being slidably and rotatably movable in said slot, at least one of said guideways being formed intermediate its ends with a portion adapted to coact with the adjacent trunnion to compel the lower end of said lifter to execute a preliminary upward movement toward said shoulder before passing from beneath said shoulder.

8. In a car coupler, the combination with a coupler head, knuckle and vertically movable lock for said knuckle, of a lifter for actuating said lock, said lifter being operatively connected to said lock so as to be slidably and pivotally movable with respect thereto, said head being provided with a shoulder adapted to engage the lower end of said lifter to prevent accidental unlocking of said lock, the lower end of said lifter being adapted to project beyond said lock beneath said shoulder, said lock being formed with a slot for receiving said lifter which opens upwardly and also opens through one of the sides of said lock, means formed on said lock for causing said lifter to execute a preliminary movement toward said shoulder before said lifter is withdrawn from beneath said shoulder, and means on said lock rearwardly of said first named means and cooperating with said lifter for limiting the extent to which the lower end of said lifter may project beyond said lock.

In testimony whereof I affix my signature.

WILLIAM KELSO.